(12) United States Patent
MacDonald et al.

(10) Patent No.: US 9,268,377 B2
(45) Date of Patent: Feb. 23, 2016

(54) ELECTRONIC DEVICE HAVING A PASSIVE HEAT EXCHANGE DEVICE

(75) Inventors: Mark MacDonald, Beaverton, OR (US); Yoshifumi Yoshi Nishi, Ushiku (JP)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 14/006,547

(22) PCT Filed: Dec. 28, 2011

(86) PCT No.: PCT/US2011/067514
§ 371 (c)(1),
(2), (4) Date: Sep. 20, 2013

(87) PCT Pub. No.: WO2013/100946
PCT Pub. Date: Jul. 4, 2013

(65) Prior Publication Data
US 2014/0009888 A1    Jan. 9, 2014

(51) Int. Cl.
*G06F 1/16* (2006.01)
*G06F 1/20* (2006.01)

(52) U.S. Cl.
CPC .............. *G06F 1/203* (2013.01); *G06F 1/1681* (2013.01); *G06F 1/206* (2013.01); *G06F 2200/203* (2013.01)

(58) Field of Classification Search
CPC ........... G06F 1/20; G06F 1/203; G06F 1/206; G06F 1/1681
USPC .................. 361/679.48, 679.54–679.56, 690, 361/694–695, 697, 704; 165/185
See application file for complete search history.

(56) References Cited

U.S. PATENT DOCUMENTS

| | | | | |
|---|---|---|---|---|
| 5,383,340 A | * | 1/1995 | Larson et al. | 62/259.2 |
| 5,588,483 A | * | 12/1996 | Ishida | 165/86 |
| 5,621,613 A | * | 4/1997 | Haley et al. | 361/679.27 |
| 5,732,765 A |   | 3/1998 | Drolen et al. | |
| 5,757,615 A |   | 5/1998 | Donahoe et al. | |
| 5,764,474 A | * | 6/1998 | Youens | 361/679.12 |
| 5,781,409 A | * | 7/1998 | Mecredy, III | 361/679.27 |
| 5,832,987 A | * | 11/1998 | Lowry et al. | 165/86 |

(Continued)

FOREIGN PATENT DOCUMENTS

| JP | 09293985 A | * | 11/1997 |
|---|---|---|---|
| JP | 2000-148304 | | 5/2000 |

(Continued)

OTHER PUBLICATIONS

International Preliminary Report on Patentability and Written Opinion received for PCT Patent Application No. PCT/US2011/067514, mailed on Jul. 10, 2014, 6 Pages.

(Continued)

*Primary Examiner* — David M Sinclair
*Assistant Examiner* — Robert Brown
(74) *Attorney, Agent, or Firm* — KED & Associates LLP

(57) ABSTRACT

An electronic device is provided that includes a base having a first side and a second side, and a lid having a first side and a second side. A hinge device may couple to the base and the lid, and may allow the lid to move relative to the base between the closed state and the opened state. A heat exchange device may be adjacent to the hinge device in an area between the base and the lid. The heat exchange device may receive heat from a component in the base.

22 Claims, 3 Drawing Sheets

(56) References Cited

U.S. PATENT DOCUMENTS

| | | | |
|---|---|---|---|
| 5,880,929 A | 3/1999 | Bhatia | |
| 5,882,929 A * | 3/1999 | Fofonoff et al. | 435/395 |
| 5,910,883 A * | 6/1999 | Cipolla et al. | 361/679.27 |
| 5,975,195 A * | 11/1999 | Lowry et al. | 165/86 |
| 6,008,986 A * | 12/1999 | Mok | 361/679.12 |
| 6,026,888 A * | 2/2000 | Moore | 165/80.3 |
| 6,028,768 A | 2/2000 | Cipolla | |
| 6,031,716 A * | 2/2000 | Cipolla et al. | 361/679.27 |
| 6,069,791 A * | 5/2000 | Goto et al. | 361/679.54 |
| 6,078,499 A * | 6/2000 | Mok | 361/679.52 |
| 6,118,655 A | 9/2000 | Mecredy, III et al. | |
| 6,122,166 A * | 9/2000 | Mochizuki et al. | 361/679.52 |
| 6,125,035 A * | 9/2000 | Hood et al. | 361/679.47 |
| 6,134,106 A * | 10/2000 | Tao et al. | 361/679.52 |
| 6,148,906 A | 11/2000 | Li et al. | |
| 6,151,207 A | 11/2000 | Kim | |
| 6,167,949 B1 * | 1/2001 | Langley et al. | 165/104.33 |
| 6,185,102 B1 * | 2/2001 | Shou et al. | 361/704 |
| 6,212,069 B1 | 4/2001 | Janik et al. | |
| 6,250,378 B1 * | 6/2001 | Kobayashi | 165/104.33 |
| 6,253,836 B1 * | 7/2001 | Mitchell | 165/86 |
| 6,255,622 B1 | 7/2001 | May et al. | |
| 6,288,896 B1 | 9/2001 | Hsu | |
| 6,341,062 B1 * | 1/2002 | Patel | 361/679.54 |
| 6,418,017 B1 | 7/2002 | Patel et al. | |
| 6,449,149 B1 * | 9/2002 | Ohashi et al. | 361/679.46 |
| 6,453,378 B1 | 9/2002 | Olson et al. | |
| 6,459,573 B1 * | 10/2002 | DiStefano et al. | 361/679.46 |
| 6,493,222 B2 * | 12/2002 | DiFonzo et al. | 361/679.48 |
| 6,515,857 B2 | 2/2003 | Ford et al. | |
| 6,771,498 B2 * | 8/2004 | Wang et al. | 361/679.47 |
| 6,795,310 B2 | 9/2004 | Ghosh | |
| 6,839,231 B2 * | 1/2005 | Fleck et al. | 361/679.26 |
| 6,958,910 B2 | 10/2005 | Tanaka et al. | |
| 7,068,508 B2 | 6/2006 | Patel et al. | |
| 7,113,399 B2 | 9/2006 | Hisano et al. | |
| 7,417,863 B2 * | 8/2008 | Park | 361/719 |
| 7,505,255 B2 * | 3/2009 | Wu | 361/679.27 |
| 7,532,467 B2 | 5/2009 | Launay et al. | |
| 7,558,062 B2 * | 7/2009 | Wang et al. | 361/695 |
| 7,746,631 B2 * | 6/2010 | Ali | 361/679.47 |
| 7,791,876 B2 * | 9/2010 | Moore et al. | 361/679.53 |
| 7,793,027 B2 | 9/2010 | Mok et al. | |
| 7,894,184 B2 * | 2/2011 | Huang et al. | 361/679.48 |
| 8,069,907 B2 * | 12/2011 | Bryant et al. | 165/46 |
| 8,355,248 B2 | 1/2013 | Nishi | |
| 8,363,392 B2 | 1/2013 | Tanaka | |
| 8,542,486 B2 * | 9/2013 | Lin et al. | 361/693 |
| 8,760,864 B2 | 6/2014 | Chiang | |
| 2002/0001176 A1 | 1/2002 | Shibasaki | |
| 2002/0012228 A1 * | 1/2002 | Ozaki et al. | 361/687 |
| 2002/0018335 A1 * | 2/2002 | Koizumi | 361/687 |
| 2002/0075647 A1 | 6/2002 | DiFonzo et al. | |
| 2003/0011983 A1 | 1/2003 | Chu et al. | |
| 2003/0123223 A1 | 7/2003 | Pokharna et al. | |
| 2004/0042172 A1 * | 3/2004 | Kusaka et al. | 361/687 |
| 2004/0130870 A1 | 7/2004 | Fleck et al. | |
| 2005/0105273 A1 | 5/2005 | Tanaka et al. | |
| 2005/0162832 A1 | 7/2005 | Muller et al. | |
| 2006/0028795 A1 | 2/2006 | Furuya | |
| 2006/0082966 A1 * | 4/2006 | Lev et al. | 361/687 |
| 2006/0114653 A1 * | 6/2006 | Seto et al. | 361/695 |
| 2006/0171113 A1 | 8/2006 | Wu | |
| 2006/0243878 A1 * | 11/2006 | Saad | 248/346.01 |
| 2008/0074842 A1 * | 3/2008 | Tracy et al. | 361/695 |
| 2008/0212278 A1 | 9/2008 | DeLuga et al. | |
| 2009/0002941 A1 | 1/2009 | Mongia et al. | |
| 2009/0213537 A1 | 8/2009 | Heesen | |
| 2009/0268392 A1 * | 10/2009 | Cheng et al. | 361/679.52 |
| 2010/0079940 A1 | 4/2010 | Mongia et al. | |
| 2010/0079945 A1 * | 4/2010 | Wang | 361/695 |
| 2010/0097764 A1 | 4/2010 | Iikubo | |
| 2010/0134976 A1 * | 6/2010 | Kuo | 361/695 |
| 2010/0134977 A1 * | 6/2010 | Chang et al. | 361/695 |
| 2010/0165567 A1 * | 7/2010 | Shih et al. | 361/679.48 |
| 2010/0214743 A1 * | 8/2010 | Huang et al. | 361/692 |
| 2010/0220439 A1 * | 9/2010 | Qin | 361/679.47 |
| 2010/0238619 A1 * | 9/2010 | Shirasaka | 361/679.08 |
| 2010/0296946 A1 * | 11/2010 | Chen et al. | 417/44.2 |
| 2011/0075352 A1 | 3/2011 | Tye et al. | |
| 2011/0134605 A1 * | 6/2011 | Chou et al. | 361/679.48 |
| 2011/0149495 A1 * | 6/2011 | Mongia et al. | 361/679.08 |
| 2011/0205699 A1 * | 8/2011 | Iijima | 361/679.08 |
| 2011/0235275 A1 * | 9/2011 | Su et al. | 361/692 |
| 2011/0242757 A1 | 10/2011 | Tracy et al. | |
| 2011/0279974 A1 * | 11/2011 | Fujiwara | 361/692 |
| 2011/0279977 A1 * | 11/2011 | Tanaka | 361/697 |
| 2011/0292592 A1 * | 12/2011 | Senatori | 361/679.46 |
| 2011/0292605 A1 * | 12/2011 | Chen et al. | 361/695 |
| 2011/0310557 A1 * | 12/2011 | Ooe | 361/692 |
| 2012/0002368 A1 * | 1/2012 | Broili et al. | 361/679.48 |
| 2012/0113593 A1 | 5/2012 | Hsu et al. | |
| 2012/0127652 A1 * | 5/2012 | Lin et al. | 361/679.46 |
| 2012/0127663 A1 * | 5/2012 | Mochizuki et al. | 361/692 |
| 2012/0130545 A1 * | 5/2012 | Haugh et al. | 700/276 |
| 2012/0236517 A1 | 9/2012 | Nakajima | |
| 2012/0327581 A1 * | 12/2012 | Pais et al. | 361/679.26 |
| 2013/0003284 A1 * | 1/2013 | Massaro et al. | 361/679.28 |
| 2013/0027873 A1 * | 1/2013 | Chen et al. | 361/679.46 |
| 2013/0027877 A1 * | 1/2013 | Yang et al. | 361/692 |
| 2013/0063889 A1 * | 3/2013 | Yee et al. | 361/679.48 |
| 2013/0077241 A1 * | 3/2013 | Senatori | 361/694 |
| 2013/0175018 A1 | 7/2013 | Huang | |
| 2013/0225065 A1 * | 8/2013 | Lee | 454/343 |
| 2013/0286292 A1 * | 10/2013 | Yamaguchi et al. | 348/725 |
| 2014/0092542 A1 | 4/2014 | Nishi et al. | |
| 2014/0092544 A1 | 4/2014 | Nishi et al. | |
| 2014/0185240 A1 * | 7/2014 | MacDonald et al. | 361/701 |

FOREIGN PATENT DOCUMENTS

| | | |
|---|---|---|
| KR | 10-2002-0032737 | 5/2002 |
| WO | 2013/100946 A1 | 7/2013 |
| WO | 2014/052185 A1 | 4/2014 |
| WO | 2014/052201 A1 | 4/2014 |

OTHER PUBLICATIONS

International Search Report and Written Opinion received for PCT Patent Application No. PCT/US2013/060879, mailed on Dec. 26, 2013, 10 pages.

International Search Report and Written Opinion dated Sep. 25, 2012 for PCT/US2011/067514.

International Search Report and Written Opinion dated Jan. 7, 2014 for PCT/US2013/060963.

\* cited by examiner

ELECTRONIC DEVICE HAVING A PASSIVE HEAT EXCHANGE DEVICE

BACKGROUND

1. Field

Embodiments may relate to a passively cooled electronic device, such as a laptop or notebook computer.

2. Background

Notebook computers and laptop computers generate heat when operating. A fan may be provided within the notebook computer and the laptop computer in order to dissipate the generated heat.

BRIEF DESCRIPTION OF THE DRAWINGS

Arrangements and embodiments may be described in detail with reference to the following drawings in which like reference numerals refer to like elements and wherein.

DETAILED DESCRIPTION

Arrangements and embodiments may be described with respect to a computer. However, arrangements and embodiments are also applicable to other electronic devices, such as mobile communication terminals.

Figure 1:
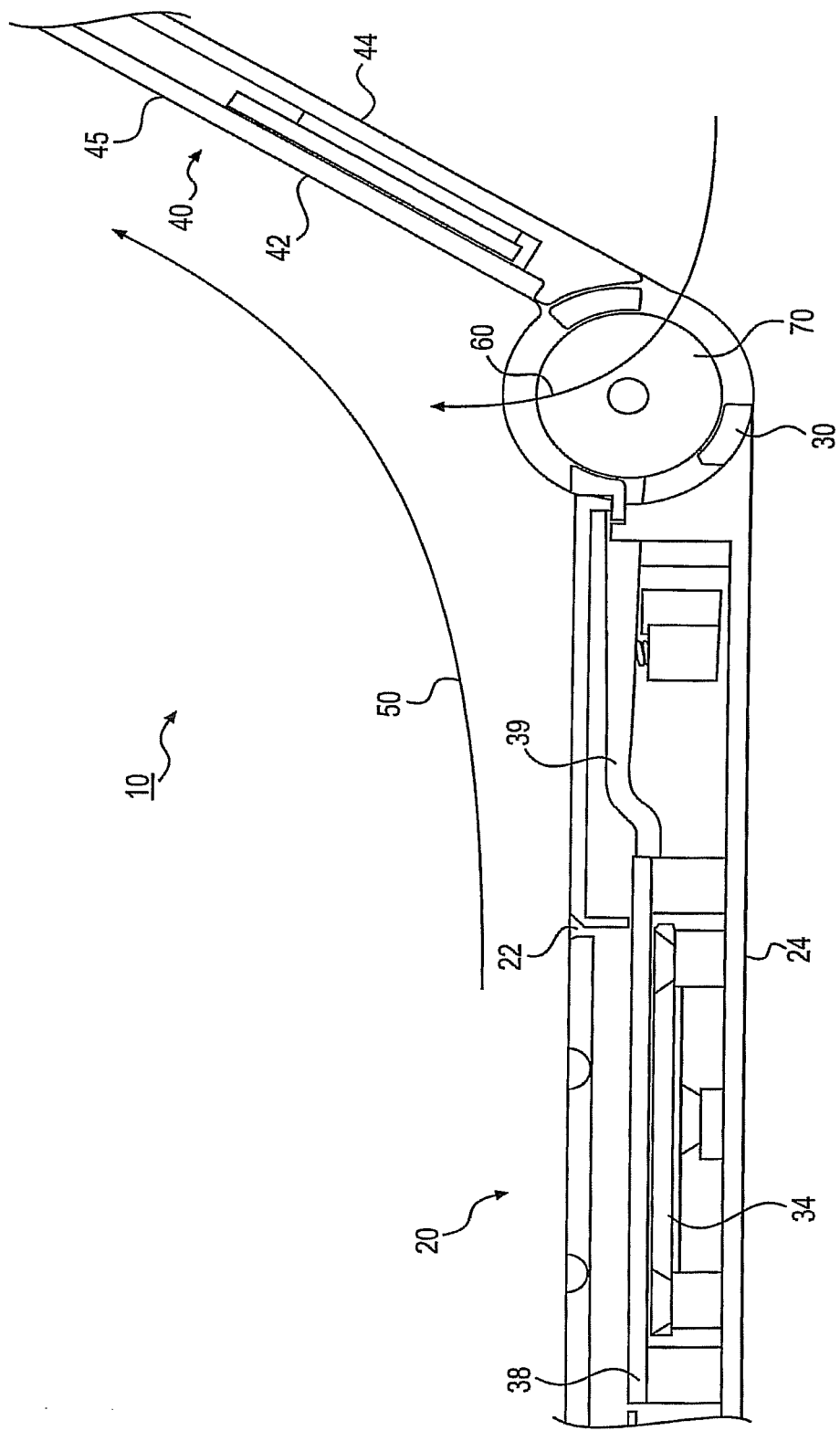
FIG. 1 is a side view of a passively cooled computer according to an example embodiment.

FIG. 1 shows a passively cooled computer according to an example embodiment. Other embodiments and configurations may also be provided.

FIG. 1 shows a passively cooled computer 10 such as a notebook computer or a laptop computer. The computer 10 may include a base 20 and a lid 40 that are coupled together by a hinge device 30. FIG. 1 shows the computer 10 in an opened state (or opened position) in which the lid 40 is separated away from the base 20. The computer 10 may also be provided in a closed state (or closed position) when the lid 40 is closed so as to be adjacent to the base 20.

The base 20 of the computer 10 may support various components such as a processor, memory, a keyboard, a circuit board, etc. These components may generate heat during operation of the computer 10.

The lid 40 of the computer 10 may support a display 45 for a user to view during use of the computer 10. The lid 40 may support other electric components. The components of the lid 40 may further generate heat during operation of the computer 10.

When the computer 10 is in an opened state, the keyboard on the base 20 and the display 45 on the lid 40 may be exposed to a user located in front of the computer 10.

The base 20 may include a first side 22 (or top side) and a second side 24 (or bottom side). The lid 40 may include a first side 42 and a second side 44. When the computer 10 is in the opened state (such as shown in FIG. 1), the first side 42 of the lid 40 is separated away from the first side 22 of the base 20. In other words, the keyboard on the first side 22 of the base 20 is exposed to a user and the display 45 on the first side 42 of the lid 40 is exposed to a user. When the computer 10 is in the closed state, the first side 42 of the lid 40 is closed so as to be adjacent to the first side 22 of the base 20. In other words, the keyboard on the first side 22 of the base 20 is not exposed to a user and the display 45 on the first side 42 of the lid 40 is not exposed to a user.

During operation of the computer 10 while the computer 10 is in an opened state, heat generated by the components of the computer 10 may create a natural convection plume 50 over the first side 22 of the base 20 and the first side 42 of the lid 40, and to an area above the lid 40. The natural convection plume 50 is a flow of heat in a direction from the first side 22 toward the first side 42 and subsequently away from the first side 42 (of the lid 40). In FIG. 1, the natural convection plume 50 flows in a left to right direction and then upward. The natural convection plume 50 dissipates heat generated by the computer 10. The natural convection plume 50 may be created without the use of a fan, even though a fan may be provided in the base 20.

The hinge device 30 may allow the lid 40 to rotate (or move) about a rotational axis that is parallel to a width of the lid 40 (or a width of the base 20). The lid 40 may rotate about the rotational axis of the hinge device 30 between the closed state and the opened state.

An embodiment may provide a passive heat exchange device 70 in an area of the hinge device 30 between the base 20 and the lid 40. The heat exchange device 70 may be adjacent to the hinge device 30 in an area between the base 20 and the lid 40, and the heat exchange device 70 may create an opening (or openings) in the area between the lid 40 and the base 20. The heat exchange device 70 may be considered passive since it does not directly include a fan.

In at least one embodiment, the heat exchange device 70 may be provided in an area near or at a back end of the base 20. In at least one embodiment, the hinge device 30 may include a first hinge device and a second hinge device spaced apart from the first hinge device. The heat exchange device 70 may be provided in an area between the first hinge device and the second hinge device.

The opening (or openings) created by the heat exchange device 70 may induce an air flow 60 from behind the computer 10 to in front of the computer 10, and into the natural convection plume 50. That is, the opening(s) of the heat exchange device 70 may allow air to pass from behind the computer 10 and into the natural convention plume 50. Stated differently, air behind the computer 10 may be sucked into the natural convection plume 50 via the opening(s) in the heat exchange device 70. This may further dissipate heat from the computer 10.

FIG. 1 also shows components within the base 20. The shown components include a processor 34 on a circuit board, a thermal attacher 38 coupled to the processor 34 and a heat spreader 39 coupled to the thermal attacher 38. The heat spreader 39 may also be considered a heat pipe. The thermal attacher 38 and the heat spreader 39 may also be called a heat dissipating device to dissipate heat from the processor 34 to the heat exchange device 70.

The heat exchange device 70 may be physically connected to the heat spreader 39 (or to the heat dissipating device). Heat generated by the processor 34 (on the circuit board) or other components may be distributed by the thermal attacher 38 and the heat spreader 39 to the heat exchange device 70. The heat exchange device 70 may therefore receive energy or heat generated from the processor 34 and/or other components.

The heat exchange device may include at least one heat pipe and a plurality of fins that extend perpendicularly from an axis of the at least one heat pipe. The at least one heat pipe may be coupled to the heat dissipating device to receive heat from components within the base 20.

The openings of the heat exchange device 70 may allow the induced air flow 60 to flow when the computer 10 is provided in the opened state, such as shown in FIG. 1. The induced air flow 60 that flows through the openings may help dissipate the heat or energy at the heat exchange device 70 to outside of the computer 10. The dissipated heat or energy may be provided to the natural convection plume 50. The natural convection plume 50 may dissipate the heat or energy away from (or above) the computer 10.

As shown by the induced air flow 60, air from behind the computer 10 may pass through the heat exchange device 70 and into the natural convection plume 50. The air may absorb heat provided at the heat exchange device 70, and remove some of the heat from the heat exchange device 70.

When the opening angle of the lid 40 is large, the convention plume 50 may detach away from the lid 40 and the heat exchange device 70 may create its own natural convection plume in order to dissipate heat.

The heat exchange device 70 and the hinge device 30 may be provided between the base 20 and the lid 40. The heat exchange device 70 may be provided adjacent to the hinge device 30 such that both the heat exchange device 70 and the hinge device 30 are provide in a same area between the base 20 and the lid 40 when the computer is in the opened state. The heat exchange device 70 may be independent of the hinge device 30.

The hinge device 30 may allow the lid 40 to move relative to the base 20 between the closed state (of the computer 10) and the opened state (of the computer 10).

The heat exchange device 70 may take any of a number of specific shapes or types. For example, the heat exchange device 70 may include a number of openings and/or fins to allow the air flow 60 to flow from the rear of the computer 10 to a front of the computer 10. The fins may extend perpendicularly from a heat pipe. The opening(s) or fins may provide an air flow passage from the rear to the front of the lid 40 such that the air flow 60 joins the natural convection plume 50. The heat exchange device 70 may be unique in that air flows from a rear to a front and ultimately to the natural convection plume 50. The air from the rear of the computer 10 may be sucked into the natural convection plume 50 via the openings of the heat exchange device 70, and thereby dissipate the heat from the heat exchange device 70.

The heat exchange device 70 may be physically connected to the base 10, and more specifically may be connected to the heat spreader 39. The heat exchange device 70 may be a passive device since it does not specifically operate using a fan to dissipate heat. The flow of air by the natural convection plume 50 may receive the induced air flow 60.

Figure 2:
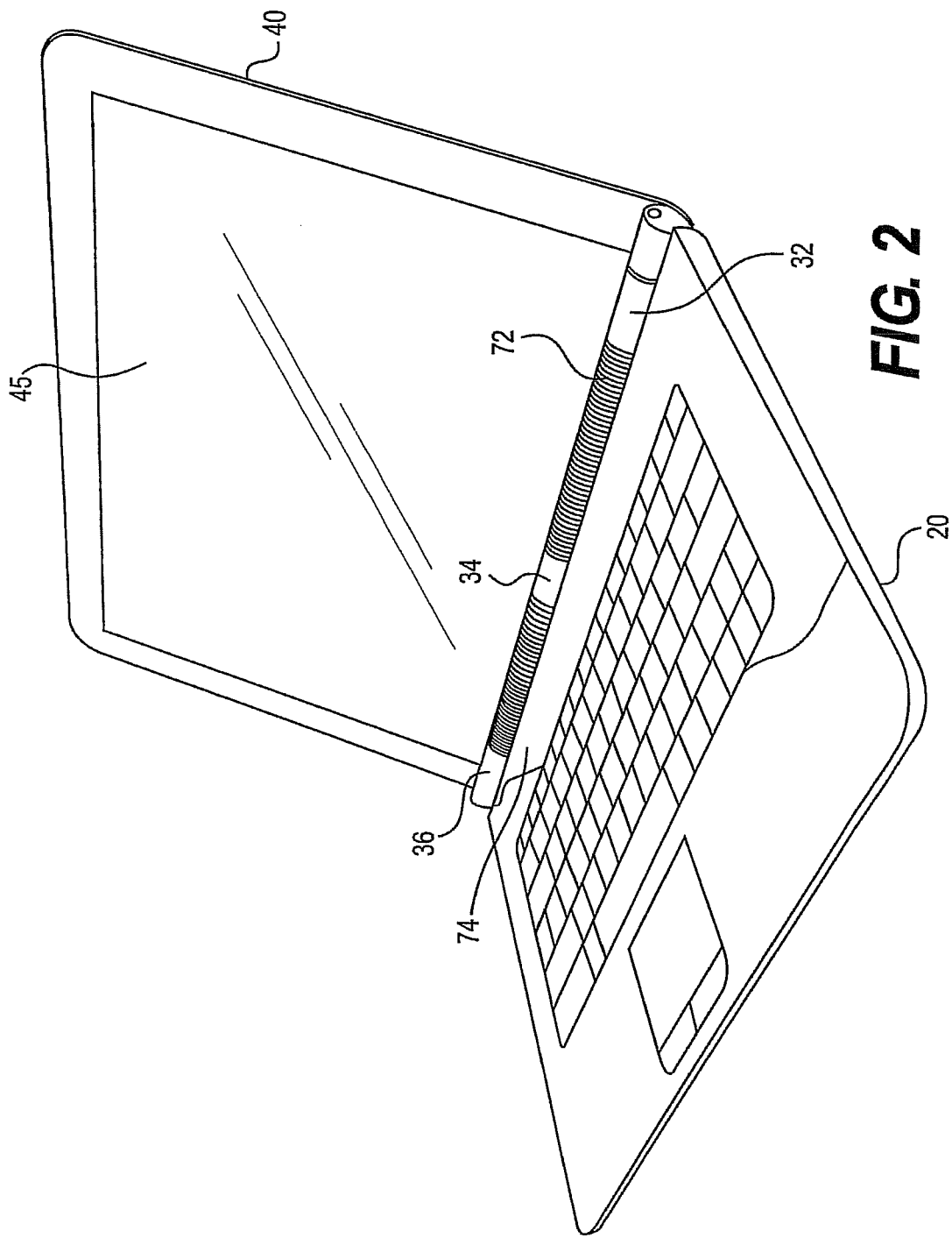
FIG. 2 shows a passively cooled computer according to an example embodiment.

FIG. 2 shows a passively cooled computer according to an example embodiment. Other embodiments and configurations are also within the scope of the present invention.

FIG. 2 shows the computer 10 in the opened state such that the lid 40 is opened when compared to the base 20. FIG. 2 shows the hinge device 30 as a first hinge component 32, a second hinge component 34 and a third hinge component 36. Each of the first, second and third components 32, 34, 36 of the hinge device 30 allow the lid 40 to move (or rotate) relative to the base 20.

FIG. 2 also shows the heat exchange device 70 as first openings 72 for a heat exchange component and second openings 74 for a heat exchange component. The heat exchange components may be fixedly attached to the base 20 such that the heat exchange components and the openings 72, 74 do not move (or rotate) when the lid 40 is opened. In other words, the first openings 72 and the second openings 74 are stationary when the lid 40 moves.

The heat exchange components may include a plurality of fins, such as extending from a heat pipe, for example. The fins may be made of a metallic material such as copper or aluminum, for example. The fins may include fins of copper or fins of aluminum, for example.

The openings 72 may be provided between a rear of the heat exchange 70 and a front of the heat exchange 70. The air flowing through the openings 72 may receive heat or energy from the fins, and dissipate the heat or energy to the natural convection plume 50 located in front of the display 45 on the lid 40.

The openings 72 may be provided between a rear of the heat exchange 70 and a front of the heat exchange 70. The air flowing through the openings 74 may receive heat or energy from the fins, and dissipate the heat or energy to the natural convection plume 50 located in front of the display on the lid 40.

Figure 3:
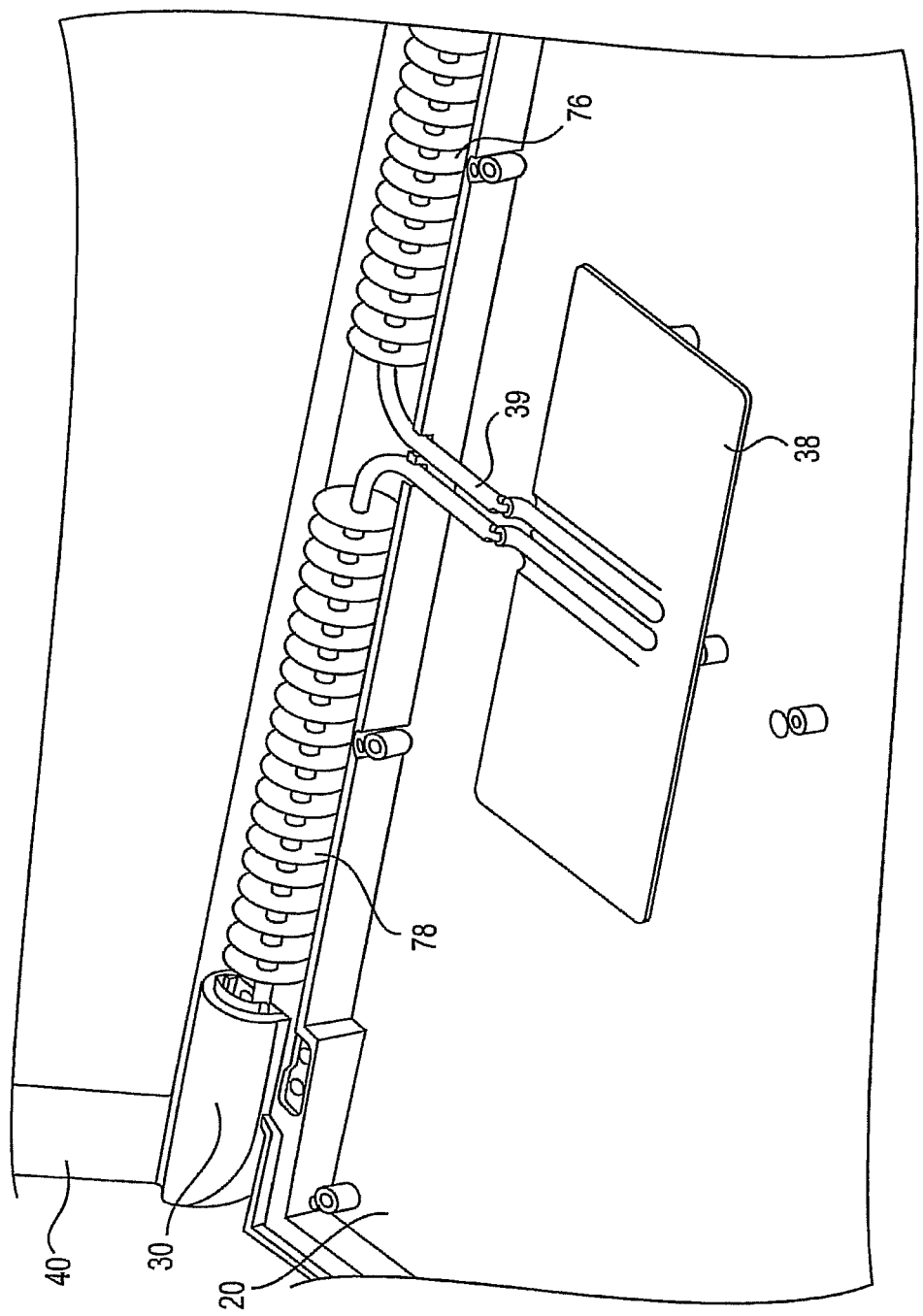
FIG. 3 shows a heat exchange device in a passively cooled computer according to an example embodiment.

FIG. 3 shows a heat exchange device in a passively cooled computer according to an example embodiment. Other embodiments and configurations may also be provided.

More specifically, FIG. 3 shows the thermal attacher 38 and the heat spreader 39 within the base 20. The thermal attacher 38 and the heat spreader 39 may be referred to as a heat dissipating device to dissipate heat from the base 20.

FIG. 3 also shows the heat exchange device 70 as a first plurality of fins 76 provided around a component (or axis) of the heat spreader 39 and a second plurality of fins 78 provided around a component (or axis) of the heat spreader 39.

The heat exchange device 70 may also include a first heat pipe that extends from a heat dissipating device (such as the thermal attacher 38) and that bends into a first area between a first hinge device and a second hinge device. The heat exchange device 70 may also include a second heat pipe that extends from the heat dissipating device and that bends into a second area between the first hinge device and the second hinge device.

The first and second plurality of fins 76, 78 may receive heat (or energy) from the heat spreader 39.

The fins of the first plurality of fins 76 may be horizontally spaced from one another. The first plurality of fins 76 may extend perpendicularly from an axis of a first heat pipe. Openings may therefore be provided between the individual fins to allow the air to flow from a rear to a front of the heat exchange device 50. These openings (or spacings) between the fins of the first plurality of fins 76 may correspond to the openings 72 shown in FIG. 2.

The fins of the second plurality of fins 78 may be horizontally spaced from one another. The second plurality of fins 78 may extend perpendicularly from an axis of a second heat pipe. Openings may therefore be provided between the individual fins to allow the air to flow from a rear to a front of the heat exchange device 50. These openings (or spacings) between the fins of the first plurality of fins 78 may correspond to the openings 74 shown in FIG. 2.

The heat exchange device 70 may be provided in different structures. FIG. 3 is merely one example embodiment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a base having a first side and a second side;
a lid having a first side and a second side, the first side of the lid to be adjacent to the first side of the base when the electronic device is in a closed state, and the first side of the lid to be separated from the first side of the base when the electronic device is in an opened state;
a hinge device to allow the lid to move relative to the base between the closed state and the opened state, the hinge device including a first hinge and a second hinge; and
a heat exchange device, in an area between the first hinge and the second hinge and in an area between the lid and the base, to receive heat from the base, the heat exchange device to include at least one heat pipe along an axis and a plurality of fins that are individually perpendicular to the axis of the at least one heat pipe, the axis of the at least one heat pipe extends between the first hinge and the second hinge in the area between the lid and the base, the plurality of fins provided in the area between the lid and the base, and
the plurality of fins includes a first fin that surrounds the axis at a first location along the heat pipe, a second fin that surrounds the axis at a second location along the heat pipe, and a third fin that surrounds the axis at a third location along the heat pipe, the second location provided between the first location and the third location,
the second fin is spaced apart from the first fin along the heat pipe to provide a first opening about the axis of the heat pipe between the first fin and the second fin, the first opening is an opening about the heat pipe in the area between the lid and the base to allow air to flow from a rear of the heat exchange device to a front of the heat exchange device, and the third fin is spaced from the second fin along the heat pipe to provide a second opening about the axis of the heat pipe between the second fin and the third fin, the second opening is an opening about the heat pipe in an area between the lid and the base to allow air to flow from the rear of the heat exchange device to the front of the heat exchange device, and
when the electronic device is in the opened state, the first opening is exposed to a first outside area in front of the first side of the lid and the first side of the base, and the first opening is exposed to a second outside area behind the second side of the lid and the second side of the base.

2. The electronic device of claim 1, wherein the heat exchange device is at a back end of the base.

3. The electronic device of claim 1, wherein the heat exchange device is a passive heat exchange device.

4. The electronic device of claim 1, wherein the plurality of fins includes fins comprising copper.

5. The electronic device of claim 1, wherein the plurality of fins includes fins comprising aluminum.

6. The electronic device of claim 1, wherein the base includes a processor and a heat dissipating device coupled to the processor.

7. The electronic device of claim 6, wherein the heat exchange device is to receive heat from the heat dissipating device.

8. The electronic device of claim 1, wherein the base further includes a keyboard on the first side of the base.

9. The electronic device of claim 1, wherein the hinge device includes a component to move when the lid moves from the closed state to the opened state, and the heat exchange device is to remain stationary when the lid moves from the closed state to the opened state.

10. The electronic device of claim 1, wherein the at least one heat pipe is coupled to a heat dissipating device to receive heat from components within the base.

11. An electronic device comprising:
a base to support a processor and a keyboard;
a lid to support a display;
a hinge device coupled to the lid and the base, the hinge device including a first hinge and a second hinge; and
a passive heat exchange device at an area between the lid and the base, the passive heat exchange device to receive heat from the base to allow air to pass from a rear of the electronic device to a front of the electronic device and the air to remove a portion of the heat received at the heat exchange device, the passive heat exchange device to include at least one heat pipe to define an axis and a plurality of fins that are transverse to the axis of the at least one heat pipe, the axis of the at least one heat pipe extends between the first hinge and the second hinge in the area between the lid and the base, the plurality of fins provided in the area between the lid and the base, and
the plurality of fins includes a first fin that surrounds the axis at a first location along the heat pipe, a second fin that surrounds the axis at a second location along the heat pipe, and a third fin that surrounds the axis at a third location along the heat pipe, the second location provided between the first location and the third location,
the second fin is spaced apart from the first fin along the axis to define a first opening about the axis of the heat pipe between the first fin and the second fin, the first opening is an opening about the axis of the heat pipe between the lid and the base to allow air to pass from the rear of the electronic device to the front of the electronic device, and the third fin is spaced apart from the second fin along the axis to define a second opening about the axis of the heat pipe between the second fin and the third fin, the second opening is an opening about the axis of the heat pipe between the lid and the base to allow air to flow from the rear of the electronic device to the front of the electronic device,
wherein the hinge device is to be provided in a first position when the electronic device is in a closed state and the hinge device is to be provided in a second position when the electronic device is in an opened state, wherein the first opening is exposed to the front of the electronic device and the first opening is exposed to the rear of the electronic device when the electronic device is in the opened state, and the air to pass through the first opening and the second opening from the rear of the electronic device to the front of the electronic device when the electronic device is in the opened state.

12. The electronic device of claim 11, wherein the plurality of fins includes fins comprising copper.

13. The electronic device of claim 11, wherein the plurality of fins includes fins comprising aluminum.

14. The electronic device of claim 11, wherein the heat exchange device includes the first and second openings between a rear of the heat exchange device and a front of the heat exchange device.

15. The electronic device of claim 11, wherein the base includes a heat dissipating device coupled to the processor.

16. The electronic device of claim 15, wherein the heat exchange device is to receive heat from the heat dissipating device.

17. The electronic device of claim 11, wherein the base has a first side and a second side, and the lid has a first side and a second side, wherein the electronic device is in the closed state when the first side of the lid is adjacent to the first side of the base, and the electronic device is in the opened state when the first side of the lid is spaced away from the first side of the base.

18. The electronic device of claim 17, wherein the hinge device includes a component to move when the electronic device is moved from the closed state to the opened state, and the heat exchange device is to be stationary when the electronic device changes from the closed state to the opened state.

19. The electronic device of claim 11, wherein the passive heat exchange device is in an area between the first hinge and the second hinge.

20. The electronic device of claim 11, wherein the at least one heat pipe is coupled to a heat dissipating device to receive heat from components within the base.

21. The electronic device of claim 11, wherein when the electronic device is in the opened state, the second opening is exposed to the front of the electronic device and the second opening is exposed to the rear of the electronic device.

22. The electronic device of claim 1, wherein when the electronic device is in the opened state, the second opening is exposed to the first outside area and the second opening is exposed to the second outside area.

* * * * *